United States Patent [19]
Goedken et al.

[11] Patent Number: 6,101,421
[45] Date of Patent: Aug. 8, 2000

[54] RESET RECOVERY IN A MICROPROCESSOR CONTROLLED DEVICE

[75] Inventors: James Francis Goedken, Arlington Heights; Richard Lee Hammon, Hanover Park, both of Ill.

[73] Assignee: Motorola, Inc., Schaumburg, Ill.

[21] Appl. No.: 08/120,144

[22] Filed: Sep. 10, 1993

[51] Int. Cl.[7] .................................................. G05B 9/02
[52] U.S. Cl. ............................................. 700/79; 700/81
[58] Field of Search ........................... 700/79, 81; 714/2, 714/719; 711/106, 159; 365/228, 222

[56] References Cited

U.S. PATENT DOCUMENTS

| | | | |
|---|---|---|---|
| 4,409,635 | 10/1983 | Kraus | 364/186 |
| 4,521,847 | 6/1985 | Ziehm et al. | 364/184 |
| 4,642,753 | 2/1987 | Easthill | 364/184 |
| 4,646,307 | 2/1987 | Nishimura | 371/66 |
| 4,658,352 | 4/1987 | Nagasawa | 371/66 |
| 4,720,812 | 1/1988 | Kao et al. | 395/700 |
| 4,777,626 | 10/1988 | Matsushita et al. | 365/226 |
| 4,819,237 | 4/1989 | Hamilton et al. | 371/66 |
| 4,905,196 | 2/1990 | Kirrmann | 365/200 |

Primary Examiner—Paul P. Gordon
Attorney, Agent, or Firm—John J. King; Daniel R. Collopy

[57] ABSTRACT

A method for recovering from a reset in a microprocessor includes steps of evaluating a predetermined pattern in a volatile memory (102), determining the type of reset which occurred depending upon whether the predetermined pattern is intact (103); and initializing the memory depending upon the type of reset. In particular, all locations in the memory will be initialized if a "power on" reset occurs (107) and initializing only selected portions of the memory if a "static" or "cradled" reset has occurred (104). If a static or cradled reset has occurred, all locations of the memory are initialized except those locations including state information to allow normal operation of the microprocessor. That is, the operation of the microprocessor based device can be restored without interruption after the reset.

13 Claims, 3 Drawing Sheets

RESET RECOVERY IN A MICROPROCESSOR CONTROLLED DEVICE

FIELD OF THE INVENTION

The present invention relates generally to the field of microprocessor controlled devices, and more particularly to a method for recovering control of a microprocessor controlled device after a reset.

BACKGROUND OF THE INVENTION

Microprocessor based products may suffer from an electrostatic discharge (ESD) or a power glitch causing a reset of the microprocessor to occur. Such a condition can be caused by exceeding the conventional $V_{dd}/V_{ss}$ static protection diodes on device inputs, for example. Such an occurrence is generally undesirable and can disrupt operation of the device. The microprocessor must be reset to restore normal operation of the device.

In printed circuit board products, a conventional technique to reset the microprocessor includes employing a watch-dog timer routine that periodically resets an external resistor/capacitor timer. When the timer expires, a hardware reset is performed. This restores normal microprocessor operation by having the microprocessor return to a known location in the program flow. However, watchdog timer routines are not always effective. Operational states may occur whereby random access memory (RAM) variables are corrupted, resulting in undesirable behavior. However, the watchdog timer has not expired and no hardware reset is generated.

Another method for recovering from an electrostatic discharge induced loss of control is for the microprocessor to detect that a problem exists. In particular, the microprocessor will look for incompatible states of the RAM variables and generate a reset when it detects a problem exists. However, this method requires a predetermination of invalid states that, in practice, would probably be incomplete. That is, it would be difficult to foresee all possible invalid states to determine whether an invalid state exists. Further, this method requires that the microprocessor operate properly when detecting a problem. However, a microprocessor does not always operate properly when an electrostatic discharge occurs.

When restoring a microprocessor after a reset, it may also be beneficial to determine the type of reset which occurred to determine where to return in the flow of the microprocessor program. While this may be done automatically in some microprocessors, certain low end microprocessors do not have this feature. A reset condition can occur generally intentionally or unintentionally. Unintentional resets can result from an undesirable electrostatic discharge or power glitch. Alternatively, an intentional reset can occur by selecting a reset button on the device, by placing the device in a predetermined condition, such as recradling a handset in a cordless telephone, or powering down the device. While it is typically desirable to start the operation of the microprocessor at the beginning of a program after an intentional reset, it may be beneficial to return to predetermined location in the program after an unintentional reset to minimize the disturbance of the operation of the device. In either case, it is beneficial to retain the state information regarding the state of the telephone if the state information is not corrupted. The state information will allow the device to return to the proper location in the microprocessor program.

Accordingly, there is a need for a method to restore normal microprocessor control after a power glitch or electrostatic discharge occurs and minimize interruption of the operation of the microprocessor based device.

DESCRIPTION OF THE PREFERRED EMBODIMENT

The present invention encompasses a method for recovering control of a microprocessor controlled apparatus affected by a reset condition. The method determines the cause of reset, and initializes the memory based upon the cause of the reset. A reset condition can occur either intentionally or unintentionally. For example, an unintentional reset can result from an undesirable electrostatic discharge or power glitch. In contrast, an intentional reset can occur by selecting a reset button on the device, by cradling the handset in a cordless telephone, or powering down the device. While it is typically desirable to start the operation of the microprocessor at the beginning of a program after an intentional reset, it may be beneficial to return to predetermined location in the program after an unintentional reset.

Further, it may be beneficial to retain certain state information in the memory for a certain cause of reset to minimize the disturbance of the operation of the device. A microprocessor-based cordless telephone has volatile memory, for example a RAM, containing predetermined data, flags and control words. The flags and control words include variables indicating the state of the telephone and are used to maintain proper operation of the microprocessor. For example, off hook, speakerphone call, handset call or other states could be contained in the flag and control words.

The method generally evaluates predetermined data stored in the memory to determine the cause of the reset which has occurred and the required steps for initializing the memory. The method first checks the memory for the predetermined data. If the predetermined data is not present, all RAM locations are initialized. If the predetermined data is present, only predetermined RAM locations are initialized, leaving the state information intact. With state information intact, the microprocessor will return to the proper location in the program in when power is restored. Accordingly, maintaining control after an unintentional reset, or regaining control after an intentional reset of the microprocessor is accomplished without requiring a watch-dog timer, normal microprocessor operation, or a determination of any invalid states as required in the prior art, and minimizes the disruption of the operation of the device.

Figure 1:
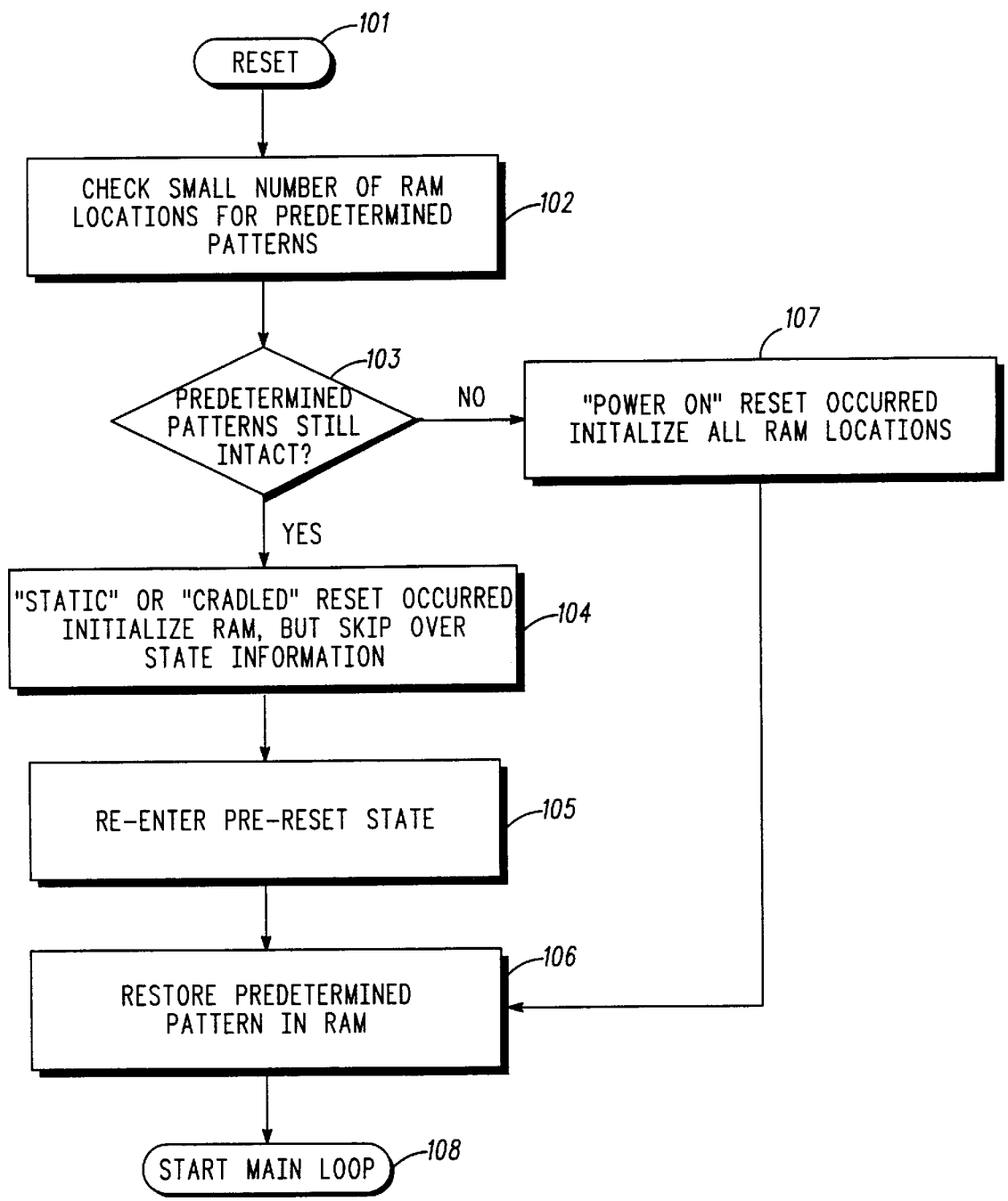
FIG. 1 is a flowchart showing the method for recovering from a reset condition according to the present invention.

Referring to FIG. 1, the method of the present invention is described in reference to a flowchart. When a reset of the microprocessor occurs at a step 101, memory locations are first evaluated at a step 102 to determine if a predetermined pattern (stored in the RAM before the reset) is present. The predetermined pattern could be represented in binary, or any other format. In the preferred embodiment, the predetermined pattern is represented as $AA_{16}$ and is stored in two sequential memory locations. Other embodiments may use other patterns such as $55_{16}$ or Barker patterns. Alternatively, a previously stored control word in memory that has not been stored solely for the purpose of checking for a predetermined pattern can be used to determine the type of reset. The advantage of using a previously stored control word is that memory is not wasted by storing some other predetermined pattern.

If the predetermined pattern is present at step 103, an electrostatic discharge reset or cradled reset has most likely occurred. Accordingly, only certain portions of the RAM need to be initialized at a step 104. Since the RAM has not lost its entire contents but has only been corrupted in certain locations by an electrostatic discharge, the present state of the telephone should be preserved. Accordingly, state information (stored in the first 5 locations of the RAM) will not be initialized. If the entire contents of RAM were initialized, this state information would be lost. The loss of the state information would result in a call being disconnected if the telephone were in a call during the electrostatic discharge.

At a step 105, the microprocessor returns to the "pre-reset" state of the call. In particular, the method determines from the uninitialized memory what state the phone was in prior to the reset and reinitializes the corrupted RAM to known good default value based on the state that existed before the reset. Therefore, if the RAM gets corrupted during a call, the method of the present invention detects the reset condition and returns the RAM to its proper state without interrupting the call.

If a predetermined pattern was initially stored in RAM for later detection, that pattern is restored at a step 106. If a control word was used as a predetermined pattern instead, this word was already restored in step 104.

If the pattern is not present in the memory at step 103, a "power-on" reset has most likely occurred. When power is removed from the RAM, by the telephone base being turned off, the memory contents will be lost and set to $FF_{16}$, or $00_{16}$, or some random pattern, upon subsequent power-up. Therefore, all locations of the RAM must be initialized at a step 107. This initialization is accomplished by the microprocessor reading the correct values from the read only memory (ROM) and storing these values in the proper RAM locations. If the initialization is not performed, the microprocessor could not execute its instructions in an orderly manner and control would be lost.

Finally, the main loop of the microprocessor program will again be started at step 108. If the state information has been restored at step 104, the microprocessor will return to the proper location in memory to maintain control of the device.

Figure 2:
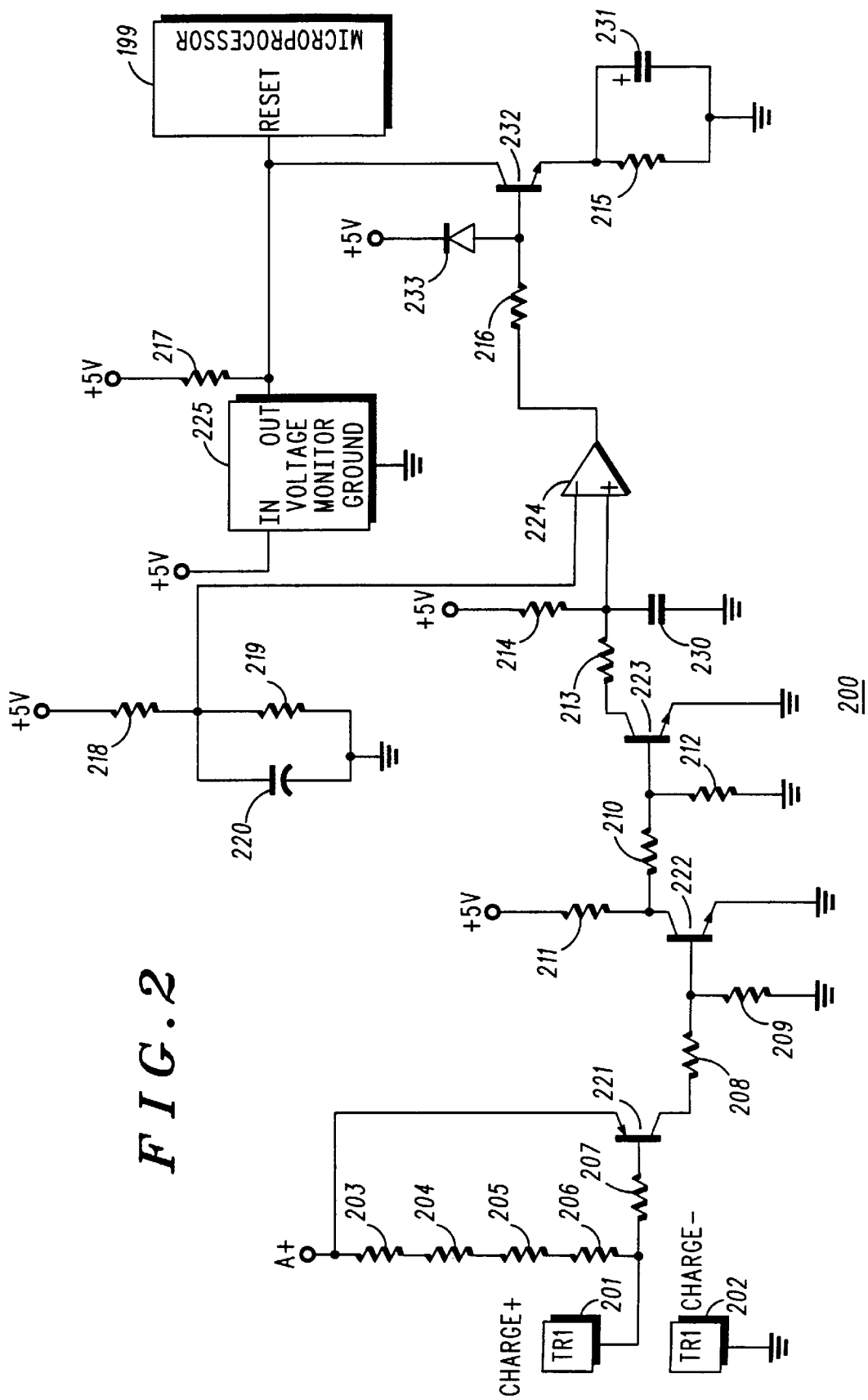
FIG. 2 is a circuit diagram of a reset circuit according to the present invention.

Turning to FIG. 2, a circuit for generating a reset is disclosed. The circuit is generally external to microprocessor 199 and resets the microprocessor whenever a device is placed across charging contacts 201 and 202. In the preferred embodiment, the device placed across the charging contacts is a cordless telephone handset and the reset circuit of the present invention is contained in the base unit of the cordless telephone. That is, a "cradled reset" (referred to at step 104 of FIG. 1) will be generated whenever the cordless telephone handset is returned to its cradle for charging the handset's battery. While the reset circuit of the present invention is described in reference to a cordless telephone, a typical block diagram of which illustrated in FIG. 3, other microprocessor controlled devices may use the method and reset circuit of the present invention. For example, the reset circuit and method of the present invention can be employed in cellular telephones and trunking radios.

Referring now to FIG. 2, the reset circuit of the present invention generally includes bias resistors 203–219, transistors 221–223 and 232, capacitors 220, 230 and 231, an op amp 224 and a voltage monitor 225. These elements are configured as shown in FIG. 2 to generate a reset at microprocessor 199 when a handset is placed across contacts 201 and 202 (i.e. a cradle reset). When the handset is not in the cradle, the charge+contact 201 is pulled to A+ (12Volts (V)) via resistors 203–206, turning transistor 221 off. With transistor 221 off, there is no bias for transistor 222 and the collector of 222 is pulled to 5V via resistor 211. With transistor 222 off, the base of transistor 223 is biased on and collector of transistor 223 is at 0.1V. Capacitor 230 is discharged to 0.1V via resistor 213, placing the non-inverting input of op amp 224 at 0.1V. The resistor divider including resistors 218 and 219 generates 3.0V at the inverting input of op amp 224. Capacitor 220 is coupled to the resistor divider network to reduce noise on the 3V of the resistor divider network. Because the voltage at the inverting input of the op amp exceeds the voltage at the non-inverting input, the output of the op amp is 0V. With 0V at the base of transistor 232, transistor 232 is off and capacitor 231 is discharged to 0V via resistor 215. Since the 5V supply is above 4.3V, the output of voltage monitor 225 is off. Therefore, the output of voltage monitor is pulled to 5V via resistor 217 and the reset to the microprocessor is maintained at 5V.

When the handset is inserted into the cradle to generate a cradled reset, the charge+contact 201 is pulled down to 4.5V. With the charge+contact at 4.5V, transistor 221 is biased on and the collector of transistor is 11.9V. This voltage of 11.9V allows the base of transistor 222 to be biased on, pulling the voltage at the collector to 0.1V. With transistor 222 on, there is no bias current for transistor 223 and transistor 223 is therefore off. This allows capacitor 230 to start charging up with the charge current being provided by resistor 214. When capacitor 230 charges to 3.01V, the non-inverting input of op amp 224 is higher then the inverting input and the output of op amp 224 is then at 10.5V. The 10.5V is then applied to the base of transistor 232, turning on the transistor. The voltage at the base of transistor 232 is limited to 5.7V by diode 233. When the transistor 232 is first turned on, capacitor 231 is discharged and the collector of transistor 232 is momentarily pulled to 0.1V and the microprocessor is put into reset. Capacitor 231 will continue to charge via resistor 216 and base to emitter path of transistor 232 to a voltage of 5V, taking the microprocessor out of reset. This low reset pulse is greater then 10 microseconds wide. After the handset is removed, the circuit will then go back to the previous state when the handset is out of the cradle.

Figure 3:
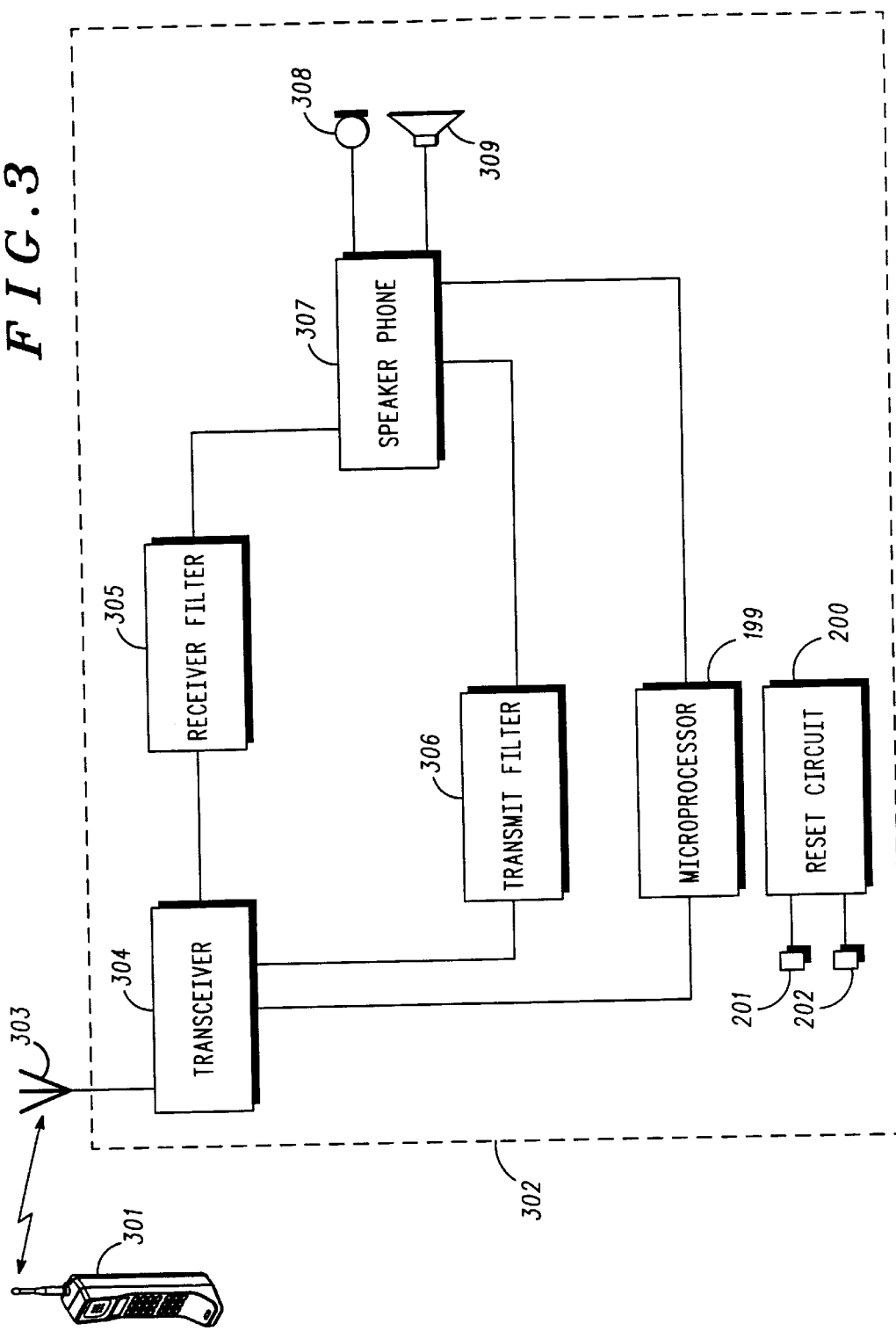
FIG. 3 is a block diagram of a cordless telephone incorporating the method of FIG. 1 and the reset circuit of FIG. 2.

A block diagram of a typical cordless telephone using the method and reset circuit of the present invention is illustrated in FIG. 3. This figure shows a cordless handset 301 that communicates with a base unit 302 through an RF channel. Base unit 302 is connected to the local telephone system. Base unit 302 includes an antenna 303 to communicate with the handset 301. A transceiver 304 demodulates a received signal and modulates a signal to be transmitted. Receive filter 305 and transmit filter 306 filter received and transmitted signals to remove noise. If the telephone has a speakerphone option, a speaker 309 and a microphone 308 are connected to the speakerphone circuitry 307. Base unit 302 is controlled by the microprocessor 199 that is coupled to reset circuit 200 (shown in detail in FIG. 2) of the present invention. Contacts of handset 301 can be coupled to contacts 201 and 202 of the base unit 302.

The present invention provides the substantial benefit over the prior art in that it maintains control after an unintentional reset, or regains control after an intentional reset of the microprocessor without requiring a watch-dog timer, normal microprocessor operation, or a determination of any invalid states as required in the prior art, and minimizes the disruption of the operation of the device. The method of the present invention, therefore, can tolerate an asynchronous reset in such a way that does not hinder proper operation of the telephone. The method corrects any corrupted RAM variables without requiring knowledge of what RAM, if any, is corrupted.

What is claimed is:

1. A method for recovering control of a microprocessor controlled device affected by a reset condition, the device having volatile memory containing predetermined data and state information, the method comprising the steps of:

evaluating the volatile memory for the predetermined data;

initializing all locations of the volatile memory when the predetermined data is not present; and initializing only predetermined locations of the volatile memory when the predetermined data is present.

2. The method for recovering control of a microprocessor controlled device according to claim 1, wherein said step of initializing only predetermined locations includes initializing all volatile memory locations other than locations containing state information.

3. The method for recovering control of a microprocessor controlled device according to claim 1, said method further including a step of returning to a pre-reset state when the predetermined data is present.

4. The method for recovering control of a microprocessor controlled device according to claim 1, said method further including a step of restoring the predetermined data in the volatile memory.

5. A method for recovering control of a microprocessor controlled device affected by a one of a plurality of reset conditions, the device having volatile memory containing predetermined data and state information, the method comprising the steps of:

evaluating the volatile memory for the predetermined data;

determining a type of reset based upon the status of the predetermined data; and initializing selected portions of the volatile memory, the selected portions being determined by the type of reset.

6. The method for recovering control of a microprocessor controlled device according to claim 5 wherein said step of determining a type of reset includes determining whether the predetermined data is present.

7. The method for recovering control of a microprocessor controlled device according to claim 5, said step of initializing selected portions of the volatile memory includes initializing all memory locations when a first type of reset is determined.

8. The method for recovering control of a microprocessor controlled device according to claim 7, wherein said step of initializing selected portions when a first type of reset is determined includes initializing selected portions in response to a power-on condition.

9. The method for recovering control of a microprocessor controlled device according to claim 5, said step of initializing selected portions of the volatile memory includes initializing locations of the volatile memory other than locations containing state information when a second type of reset is determined.

10. The method for recovering control of a microprocessor controlled device according to claim 9, wherein said step of initializing selected portions when a second type of reset is determined includes initializing selected portions in response to an electrostatic discharge.

11. The method for recovering control of a microprocessor according to claim 9, said method further including a step of returning to a pre-reset state if a second type of reset is determined.

12. The method for recovering control of a microprocessor according to claim 5, said method further including a step of restoring the predetermined data in the volatile memory.

13. A method for recovering control of a microprocessor controlled device affected by a reset condition, the device having volatile memory containing predetermined data and state information, the method comprising the steps of:

evaluating the volatile memory for the predetermined data;

initializing all locations of the volatile memory when the predetermined data is not present;

initializing predetermined locations of the volatile memory when the predetermined data is present, the predetermined locations including locations other than locations containing the state information;

returning to a pre-reset state when the predetermined data is present; and restoring the predetermined data in the volatile memory.

\* \* \* \* \*